United States Patent
Ito

[11] Patent Number: 5,981,944
[45] Date of Patent: Nov. 9, 1999

[54] OPTICAL SCANNER WHICH REDUCES THE EFFECTS OF EXTERNAL ELECTRICAL NOISE AND DISTURBING LIGHT

[75] Inventor: Koji Ito, Nagoya, Japan

[73] Assignee: Brother Kabushiki Kaisha, Nagoya, Japan

[21] Appl. No.: 08/789,990

[22] Filed: Jan. 28, 1997

[30] Foreign Application Priority Data

Feb. 5, 1996 [JP] Japan .................................. 8-018692

[51] Int. Cl.[6] .................................................. H01J 3/14
[52] U.S. Cl. ........................ 250/235; 250/234; 358/463
[58] Field of Search .................... 250/234, 235, 250/236, 214 C; 358/464, 463, 494, 496, 497

[56] References Cited

U.S. PATENT DOCUMENTS

| | | | |
|---|---|---|---|
| 4,327,287 | 4/1982 | Saito et al. ............................... | 250/234 |
| 4,644,341 | 2/1987 | Warner .................................... | 340/753 |
| 5,543,955 | 8/1996 | Yamazaki et al. ....................... | 250/235 |
| 5,621,205 | 4/1997 | Warner et al. .......................... | 250/214 C |

Primary Examiner—Edward P. Westin
Assistant Examiner—Kevin Pyo
Attorney, Agent, or Firm—Oliff & Berridge, PLC

[57] ABSTRACT

An optical scanner reduces the effects of external electrical noise and disturbing light that leaks therein during an image read operation. Light beams emitted by a plurality of light sources are synthesized so as to travel along a common optical path, the synthesized light beams are deflected by a polygonal rotating mirror and condensed. The condensed light beams fall on a beam splitting device. One of the light beams is projected on the image forming surface of a photosensitive member for image recording, another light beam scans the image surface of a document, and light scattered by the light reflecting from the image surface of the document is detected by photoelectric devices. The light beam projected on the document is modulated by a modulator in accordance with a fixed frequency, and signals provided by the photoelectric devices are demodulated by a demodulator.

24 Claims, 9 Drawing Sheets

OPTICAL SCANNER WHICH REDUCES THE EFFECTS OF EXTERNAL ELECTRICAL NOISE AND DISTURBING LIGHT

BACKGROUND OF THE INVENTION

1. Field of the Invention

The invention relates to an optical scanner incorporated into a laser printer or the like that records an image by an electrophotographic process, that is capable of reading image information from a document.

2. Description of Related Art

A known image reading optical apparatus capable of reading an image from the entire surface of a document obtains image information about the image by illuminating the surface of the document by, for example, a fluorescent lamp, guiding light reflected from the surface of the document by a reducing projection lens to, for example, a line sensor comprising a charge-coupled device (CCD), obtaining image information about one line of the image from the output of the line sensor, and scanning the surface of the document in a feed direction perpendicular to a scanning direction to obtain image information about the entire image.

A known optical image writing apparatus scans a photosensitive layer formed on the surface of a photosensitive drum in a scanning direction parallel to the axis of the photosensitive drum by deflecting a laser beam with a polygonal rotating mirror to form a latent image of an image on the photosensitive layer. The latent image formed by the optical image writing apparatus is developed into a toner image by a developing unit using an electrophotographic method, and the toner image is transferred to a recording sheet by a transfer unit, and the toner image is fixed to the recording sheet by a fixing unit to record the image on the recording sheet.

A prior art apparatus disclosed in Japanese Unexamined Patent Publication No. 7-199097 has both the foregoing image reading function and the foregoing image writing function, and uses optical parts common to an optical image reading unit and an optical image writing unit.

This apparatus disclosed in Japanese Unexamined Patent Publication No. 7-199097 detects light reflected from the scanned surface of a document to read an image formed on the document. Therefore, erroneous image information about the image is obtained or, at worst, there is the possibility that the apparatus is unable to read the image at all when disturbing light leaks into the apparatus.

Generally, the reflected light is detected by a photoelectric device and a photocurrent proportional to a quantity of light fallen on the photoelectric device and provided by the photoelectric device is amplified by an amplifier. The frequency of the photocurrent generated by the photoelectric device is at a minimum when the entire surface of the document is blank. The frequency is at a maximum when there are black dots or white dots on the surface of the document corresponding to a maximum resolution dependent on the diameter of a spot formed on the document by the scanning beam, the document being scanned continuously with the scanning beam deflected by the polygonal rotating mirror. Therefore, the amplifier must have a flat gain in a wide frequency range from the minimum to the maximum frequency. Such an amplifier has a large scale and hence it is impossible to construct the apparatus at a low cost. Moreover, when the operation of the amplifier is disturbed by noise, such as electromagnetic waves, the image information is affected by the noise and, consequently, an image having dark lines or blank spots is formed.

SUMMARY OF THE INVENTION

The invention has been made to solve the foregoing problems and it is therefore an object of the invention to provide an optical scanner capable of reducing the effect of disturbing light that leaks therein and of reducing the effect of electrical noise by illuminating a document with a light beam modulated in accordance with a fixed frequency, and demodulating an electric signal obtained by receiving light scattered by the document to obtain image information about the document.

According to the invention, an optical scanner comprises first and second light sources for emitting first and second light beams having different wavelength characteristics, a beam synthesizing device that synthesizes light beams emitted by the first and second light sources so that the light beams travel along a common optical path, a light deflecting device disposed on the common optical path to deflect the light beams, a condensing device for condensing the synthesized light beams deflected by the light deflecting device, a beam splitting device which causes the first light beam to fall on the image forming surface of a photosensitive member and causes the second light beam to fall on an image surface of a document to be read, and a photodetecting device which detects light from the second light beam scattered and reflected by the image surface of the document. A modulator modulates the second light beam in accordance with a fixed frequency, a demodulator demodulates a signal provided by the photodetecting device in accordance with the fixed frequency to obtain a demodulated signal and causes reading of image information from the document on the basis of the demodulated signal.

The first and second light beams emitted by the first and second light sources are synthesized so as to travel along the common optical path, the synthesized light beams are reflected and deflected by the light deflecting device, the reflected light beams are condensed by the condensing device, the condensed light beams are sent to the beam splitting device, the beam splitting device causes the first light beam to fall on the image forming surface of the photosensitive member to record an image and causes the second light beam to fall on the image surface of the document, and the photodetecting device detects light from the second light beam scattered and reflected from the image surface of the document. The modulator modulates the second light beam in accordance with the fixed frequency, the demodulator demodulates a signal provided by the photodetecting device in accordance with a frequency corresponding to a modulating signal used by the modulator and provides a demodulated signal. Image information is read from the document on the basis of the demodulated signal. Accordingly, the effect of disturbing light can be suppressed and the effect of electrical noise can be reduced.

In the optical scanner of the invention, it is desirable that the second light beam emitted by the second light source and falling on the document is a beam of visible light of a wavelength in the range of about 400 to about 700 nm. The light beam of a wavelength in the range of about 400 to 700 nm is projected on the document after modulation, the light scattered by the document is detected by the photodetecting device, and the output signal of the photodetecting device is demodulated by the demodulator to read the image information on the document.

In the optical scanner of the invention, each light source may be a light-emitting semiconductor device, and the modulator may be constructed so as to control a current for driving the light-emitting semiconductor device. The light beam emitted by the light-emitting semiconductor device is modulated and the modulated light beam falls on the document, the photodetecting device detects the light scattered by the document, and the demodulator demodulates the output signal of the photodetecting device to cause reading of the image information on the document.

In the optical scanner of the invention, at least the first light beam may be modulated in accordance with a demodulating signal provided by the demodulator, and the first light beam thus modulated may be made to fall on the image forming surface of the photosensitive member. In this case, an image represented by the image information on the document can be written to the image forming surface of the photosensitive member simultaneously with reading the image information from the document.

In the optical scanner of the invention, the photodetecting device may comprise a plurality of photoelectric devices. In this case, the quantities of signals representing image information about different positions on the document are substantially the same and, therefore, image reading can be insured and stabilized.

In the optical scanner of the present invention, the beam synthesizing device and the beam splitting device may be dichroic mirrors which reflect or transmit the first and second light beams in accordance with the wavelengths of the first and second light beams. In this case, the light beams to be made to fall on the image forming surface of the photosensitive member and those to be made to fall on the image surface of the document can surely be separated from each other according to the wavelength characteristics and, therefore, image information reading and image information writing can accurately be achieved.

As is apparent from the foregoing description, the optical scanner of the invention modulates the second light beam in accordance with a fixed frequency to irradiate the document, and demodulates the reflected light from the document to read the image information from the document. Therefore, the image reading operation is scarcely affected by the effect of disturbing light, the influence of electromagnetic noise on the photoreceiver can be prevented, the electrical circuit can be formed in a simple circuit configuration and the optical scanner can be manufactured at low costs.

Images formed with ink or dye can surely be read in a high accuracy when the light sources that emit beams of visible light of wavelengths in the range of 400 to 700 nm are employed.

When light-emitting semiconductor devices are employed as the light sources for illuminating the document and the light emitted by the light-emitting semiconductors is modulated by controlling driving currents for driving the light-emitting semiconductor devices, the light can be modulated by an inexpensive modulator having a simple circuit configuration.

When the signal representing image information on the document is used for driving the light sources and modulating the light emitted by the light sources, the read operation and the write operation can simultaneously be executed, whereby a rapid copying operation can be achieved. Since the image information read from the document need not be stored in a storage device, the optical scanner can be manufactured at low costs.

When the photodetecting device comprises a plurality of photoelectric devices, the quantities of signals representing image information about different positions on the document are substantially the same and, therefore, image reading can be insured and stabilized.

When the beam synthesizing device and the optical path dividing device are dichroic mirrors which reflect or transmit the light beams based on wavelength characteristics, the light beams to be made to fall on the image forming surface of the photosensitive member and those to be made to fall on the image surface of the document can surely be separated from each other according to the wavelength characteristics and, therefore, image information reading and image information writing can accurately be achieved.

BRIEF DESCRIPTION OF THE DRAWINGS

Preferred embodiments of the invention will be described in detail, with reference to the following figures, wherein.

DETAILED DESCRIPTION OF PREFERRED EMBODIMENTS

Optical scanners embodying the invention will be described hereinafter with reference to the accompanying drawings, wherein like numerals indicate like parts.

Figure 1:
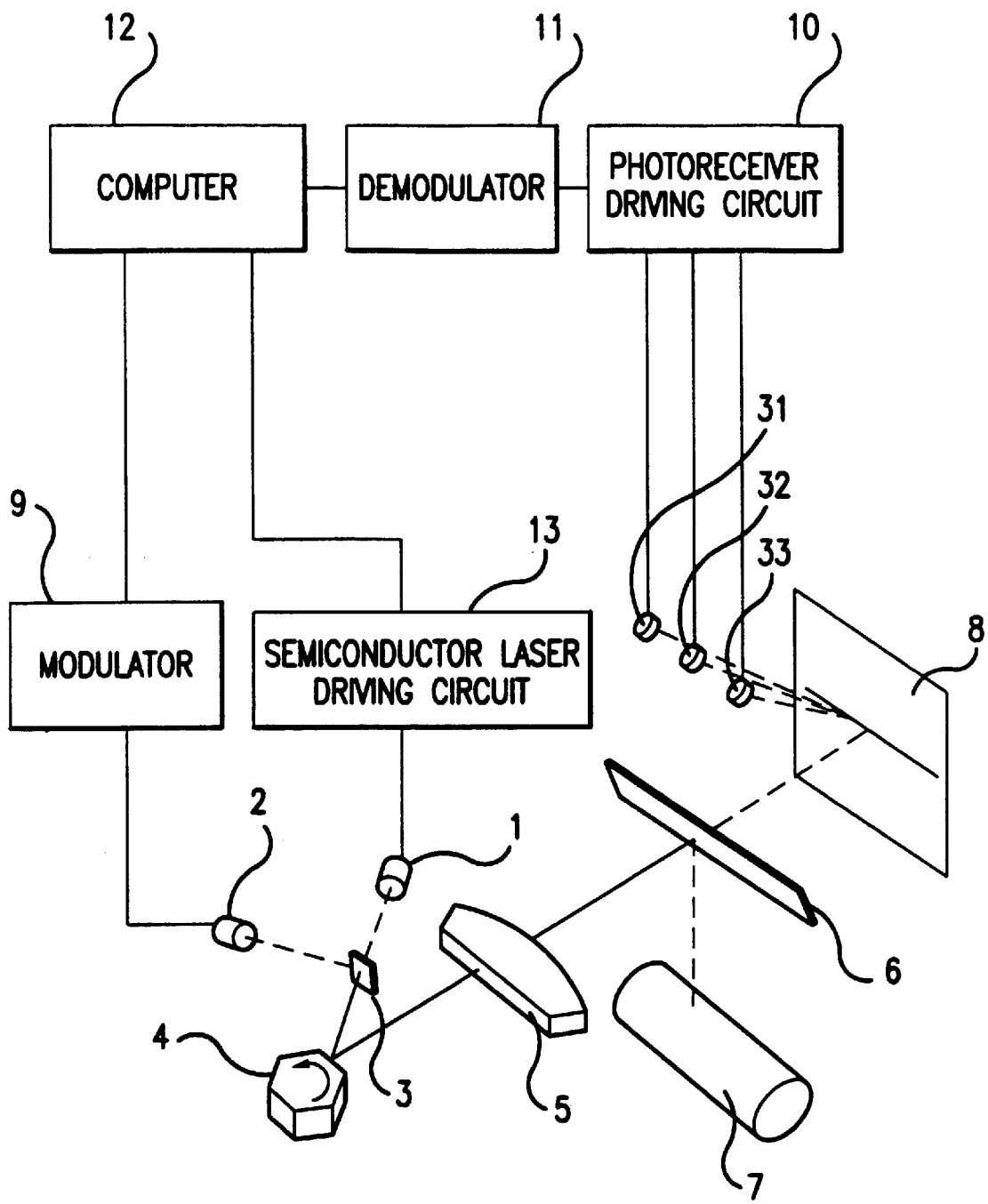
FIG. 1 is a typical views of an optical scanner in a preferred embodiment according to the invention.

An optical scanner in a first embodiment according to the invention is shown in FIG. 1. The optical scanner has functions of both an image writing optical system and an image reading optical system.

First, the configuration of the optical scanner as an image writing optical system will be described. A first dichroic mirror 3, i.e., a beam synthesizing device, and a polygonal rotating mirror 4, i.e., a light deflecting device, are disposed on an optical path along which a first light beam of a wavelength λ1 (for example, 780 nm) emitted by a first semiconductor laser 1, i.e., a light source, travels. The first light beam emitted by the first semiconductor laser 1 travels through the first dichroic mirror 3, is deflected by the polygonal rotating mirror 4, is condensed by an fθ lens 5 and is reflected onto a photosensitive member 7 by a second dichroic mirror 6, i.e., a beam splitting device, disposed on the optical path. The polygonal rotating mirror 4 rotates at a fixed rotating speed to scan the surface of the photosensitive member 7 with the first light beam. The first light beam is detected by a photosensor (not shown) at a position some distance before an image recording start position. An image recording operation is started a fixed time after the detection of the first light beam to prevent the variation of the image recording start position on the photosensitive member 7 so that recording positions on the photosensitive member 7 are arranged regularly. The first dichroic mirror 3 and the second dichroic mirror 6 reflect or transmit light beams according to their wavelengths.

The configuration of the optical scanner as an image reading optical system will now be described. The beam synthesizing mirror 3 is disposed on an optical path along which a second light beam of a wavelength $\lambda 2$ (for example, 670 nm) emitted by a second semiconductor laser 2, i.e., a light source, travels. The first dichroic mirror 3 reflects the second light beam emitted by the second semiconductor laser 2 so that the second light beam travels a common optical path along which the first light beam transmitted through the first dichroic mirror 3 travels. The second light beam is deflected by the polygonal rotating mirror 4, is condensed by the fθ lens 5, and is transmitted through the second dichroic mirror 6 so as to fall at a scanning position on a document 8. Light scattered and reflected by the document 8 is detected by three photoelectric devices 31,32 and 33, such as photodiodes, i.e., photodetectors, disposed on the side of the document 8 with respect to the second dichroic mirror 6. The three photoelectric devices 31, 32 and 33 generate photoelectric currents of intensities proportional to illuminations on the photoelectric devices 31, and 33, respectively. The photoelectric currents are subjected to current-to-voltage conversion by a photoreceiver driving circuit 10, and the photoreceiver driving circuit 10 provides a signal corresponding to the sum of voltage signals corresponding to the illuminations on the photoelectric devices 31, 32 and 33.

The second light beam projected on the document 8 is modulated in accordance with a fixed frequency by a modulator 9. Therefore, the output signal of the photoreceiver driving circuit 10 includes a carrier wave of a fixed frequency. An image signal obtained by demodulating the output signal of the photoreceiver driving circuit 10 by a demodulator 11 is proportional to the intensity of light reflected from the document 8. The image signal reaches a maximum voltage when the light is reflected from a white portion on the document 8 and reaches a minimum when the light is reflected from a black portion on the document 8. Thus, image information about an image on the document is represented by voltages.

Black and white scanned portions on a scanning line of the image on the document 8 are discriminated from each other from the image signals representing the scanned portions. This scanning cycle is repeated as the document 8 is advanced in a feed direction to read the entire image information from the document 8. The densities of the scanned portions of the image can be classified by gradation according to the intensity of the reflected light. Since the distance between the second dichroic mirror 6 and the document 8 is substantially equal to that between the second dichroic mirror 6 and the photosensitive member 7, the diameter of a spot formed on the document 8 by the second light beam is substantially equal to that of a spot formed by the first light beam on the photosensitive member 7. Therefore, the image can be read in a resolution substantially equal to that in which an image is recorded. The period of the carrier wave used by the modulator 9 for modulation must be at least equal to a time in which a number of dots or lines equal to a maximum resolution specified for the optical scanner is scanned. It is desirable to use a frequency equal to several to several tens times as large as the foregoing frequency.

Figure 2:
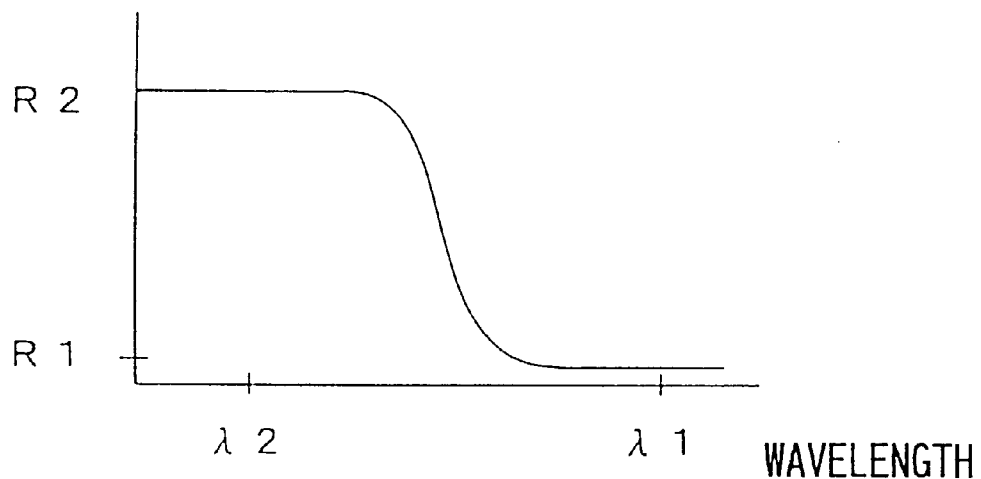
FIG. 2 is a graph showing the spectral reflection characteristics of a first dichroic mirror.
Figure 3:
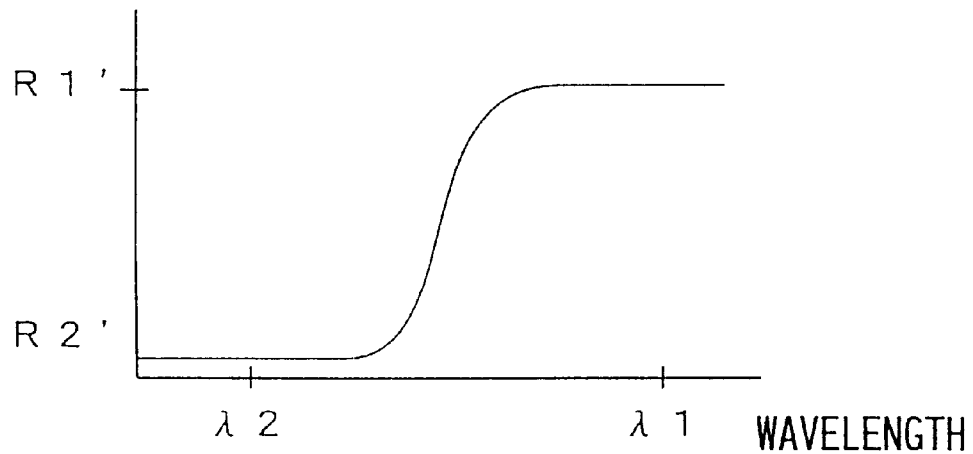
FIG. 3 is a graph showing the spectral reflection characteristics of a second dichroic mirror.

FIG. 2 is a graph showing the spectral reflection characteristics of the first dichroic mirror 3, i.e., a beam synthesizing mirror, and FIG. 3 is a graph showing the spectral reflection characteristics of the second dichroic mirror 6, i.e., a beam splitting mirror, in which wavelength is measured on the horizontal axis and reflectance is measured on the vertical axis. In FIG. 2, R1 is the reflectance of the first dichroic mirror 3 with the first light beam of the wavelength $\lambda 1$ emitted by the first semiconductor laser 1, i.e., a writing light source, and R2 is that of the first dichroic mirror 3 with the second light beam of the wavelength $\lambda 2$ emitted by the second semiconductor laser 2, i.e., a reading light source. The reflectance R2 is several hundreds to several thousands times as large as the reflectance R1. The transmittance of the second dichroic mirror 6 with the first light beam of the wavelength $\lambda 1$ is substantially equal to that of the glass base plate of the second dichroic mirror 6. In the embodiment shown in FIG. 1, the first dichroic mirror 3, i.e., a beam synthesizing mirror, transmits the first light beam of the wavelength $\lambda 1$. i.e., a writing light beam so that the first light beam travels through the first dichroic mirror 3 and falls on the polygonal rotating mirror 4, and reflects the second light beam of the wavelength $\lambda 2$, i.e., a reading light beam, so that the second light beam travels along the optical path along which the first light beam travels and falls on the polygonal rotating mirror 4.

The second dichroic mirror 6 has a wavelength characteristic as shown in FIG. 3 different from that of the first dichroic mirror 3. The second dichroic mirror 6 reflects the first light beam of the wavelength $\lambda 1$ emitted by the first semiconductor laser 1, i.e., a writing light source, and transmits the second light beam of the wavelength $\lambda 2$ emitted by the second semiconductor laser 2, i.e., a reading light source. A reflectance R1' with the wavelength $\lambda 1$ is several hundreds to several thousands times as large as a reflectance R2' with the wavelength $\lambda 2$. The transmittance of the second dichroic mirror 6 of the wavelength $\lambda 2$ is substantially equal to that of the glass base plate of the second dichroic mirror 6. In the embodiment shown in FIG. 1, the second dichroic mirror 6 splits the light beams synthesized by the first dichroic mirror 3 according to wavelength, reflects the first light beam of the wavelength $\lambda 1$, i.e., a writing light beam, toward the photosensitive member 7, and transmits the second light beam of the wavelength $\lambda 2$, i.e., a reading light beam, so that the second light beam falls on the document 8.

Naturally, the respective positions of the photosensitive member 7 and the document 8 may be interchanged when a dichroic mirror having the wavelength characteristic shown in FIG. 2 is used as the second dichroic mirror 6.

Figure 4:
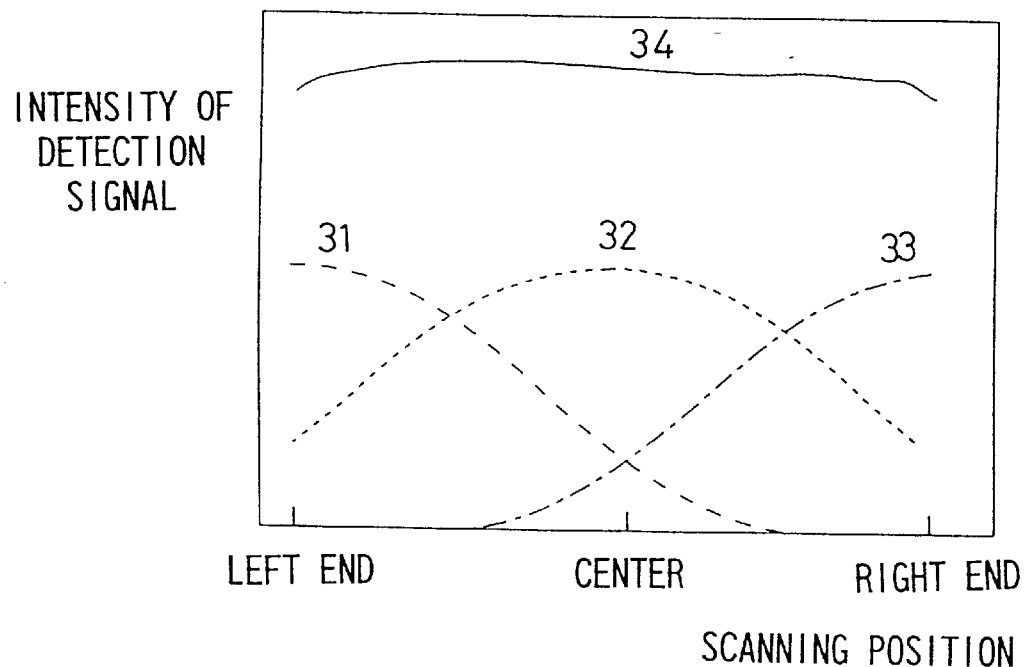
FIG. 4 is a graph showing an image signal obtained by three photoelectric devices.
Figure 5:
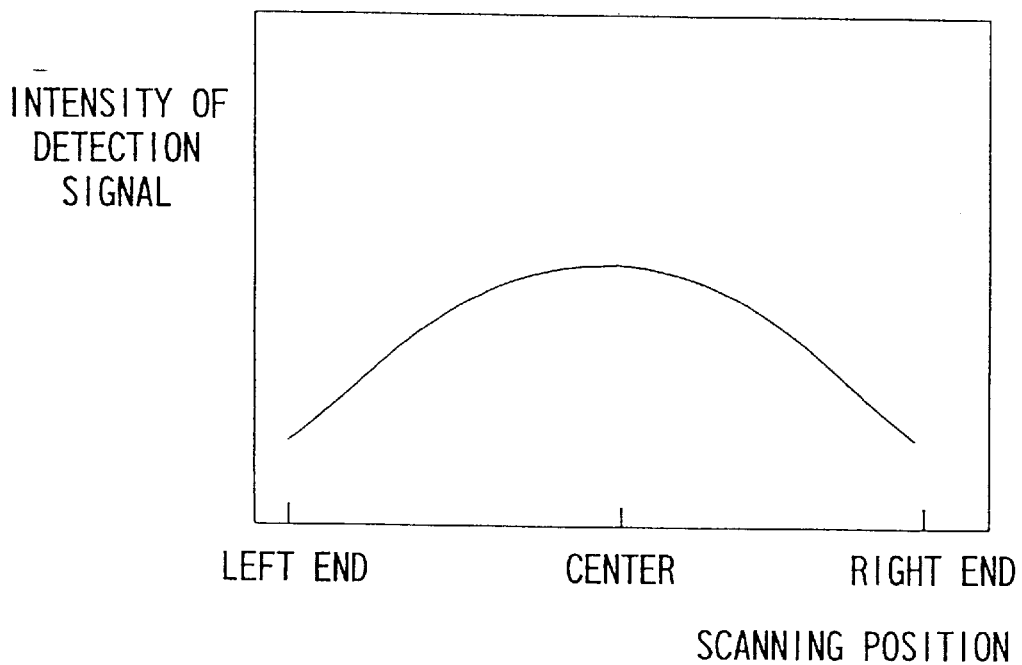
FIG. 5 is a graph showing an image signal obtained by one photoelectric device.
Figure 6:
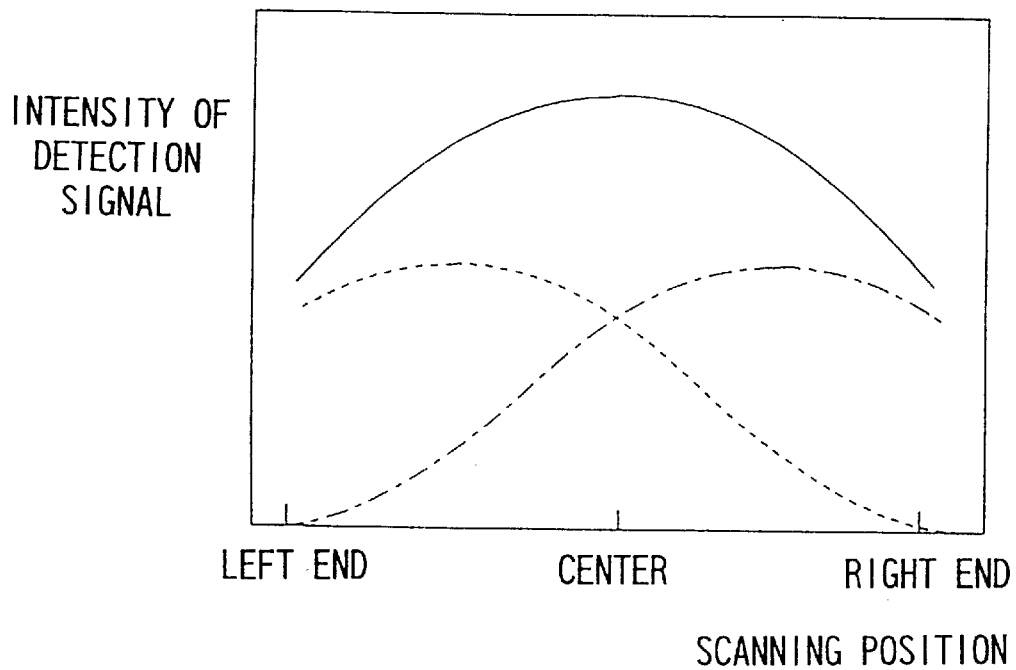
FIG. 6 is a graph showing an image signal obtained by two photoelectric devices.
Figure 7:
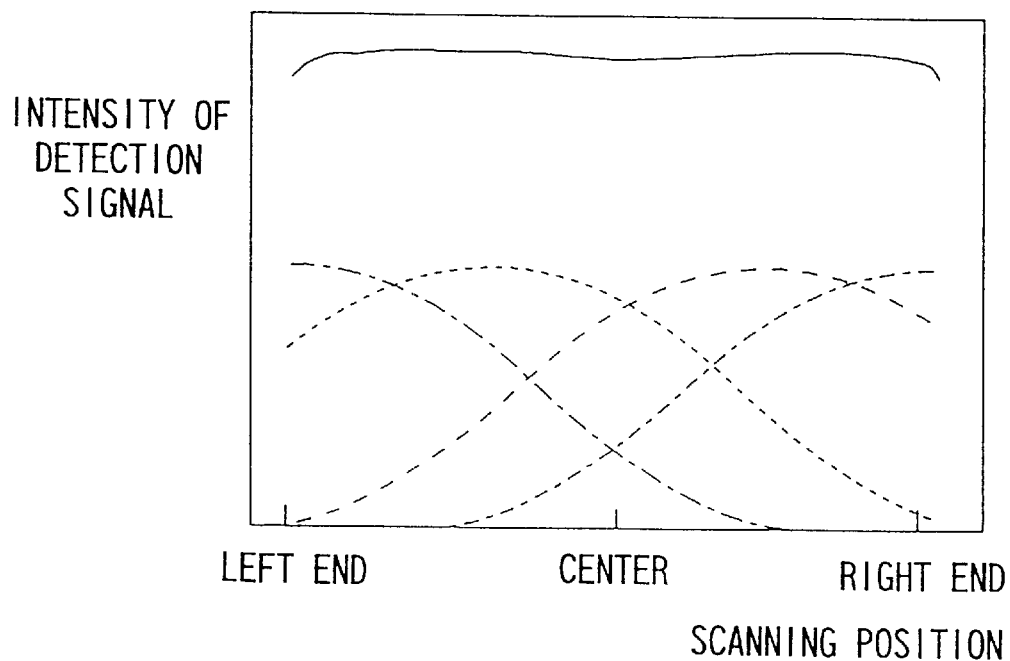
FIG. 7 is a graph showing an image signal obtained by four photoelectric devices.

FIG. 4 shows detection signals provided by the three photoelectric devices 31, 32 and 33 of the optical scanner of FIG. 1 each corresponding to the difference between the illumination on each photoelectric device of the light reflected from printed portions of an image and the light reflected from not printed portions of the image when a document of, for example, size A4 having a width of 210 mm is scanned with the second light beam. The intensity of the detection signal is measured on the vertical axis and the position of the light beam on the document is measured on the horizontal axis. In FIG. 4, a curve 34 is the sum of curves indicating the intensities of detection signals provided by the photoelectric devices 31, 32 and 33. FIGS. 5, 6 and 7 show detection signals provided by one photoelectric device, two photoelectric devices and four photoelectric devices, respectively. As is obvious from FIGS. 4 to 7, the distribution of the detection signals corresponding to different positions on the document is more uniform when more photoelectric devices are used. However, as shown in FIG. 4, the distribution of the detection signals is satisfactorily uniform when the three photoelectric devices 31, 32 and 33 are used when the photoelectric devices 31, 32 and 33 are arranged properly. Therefore, an excessive number of photoelectric devices need not be used. Thus, image information represented by detection signals of substantially the same level can be obtained for the entire width of the document when an appropriate number of photoelectric devices are arranged properly without using a line sensor.

Figure 8:
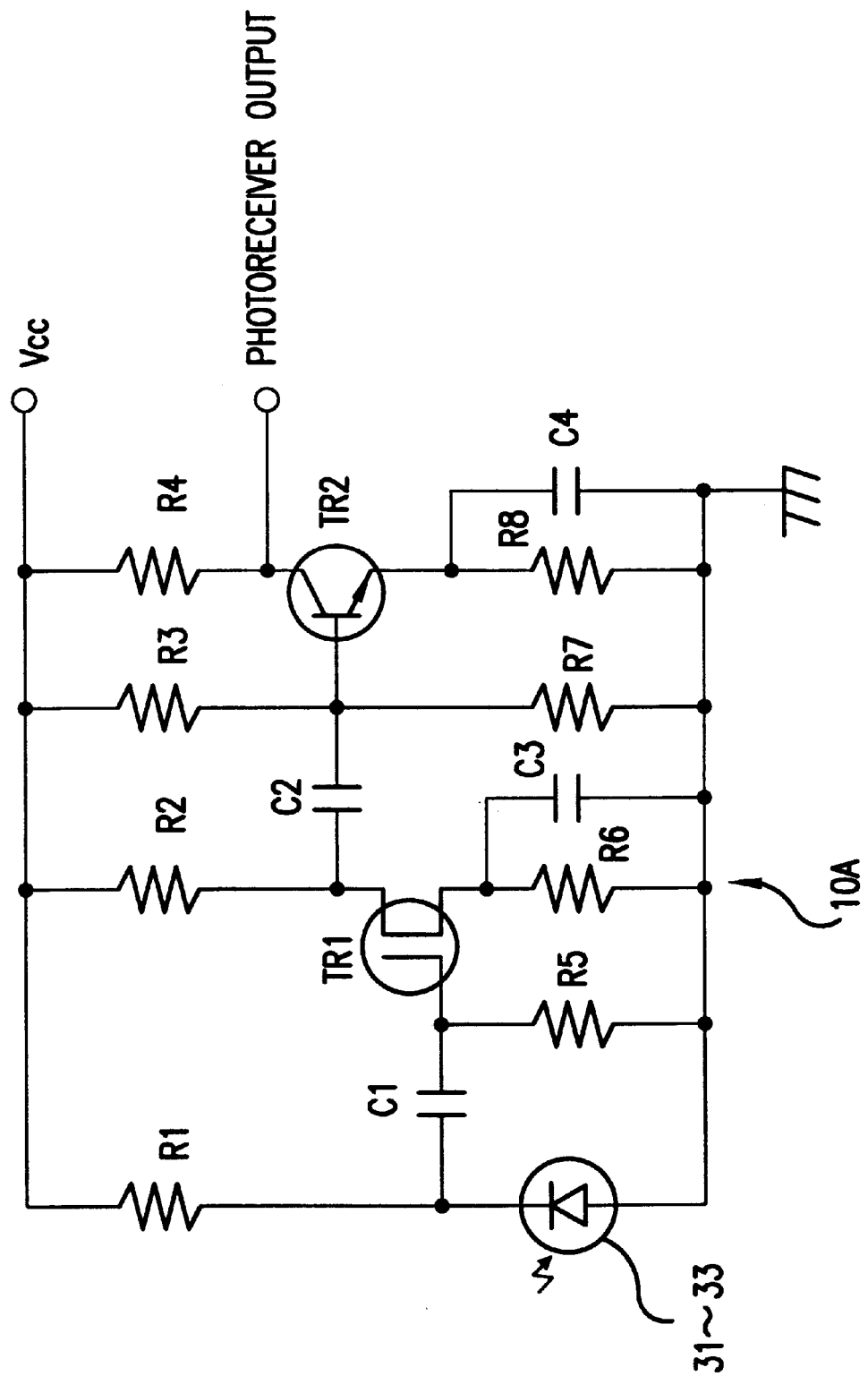
FIG. 8 is a circuit diagram of an amplifier included in a photoreceiver driving circuit.
Figure 9:
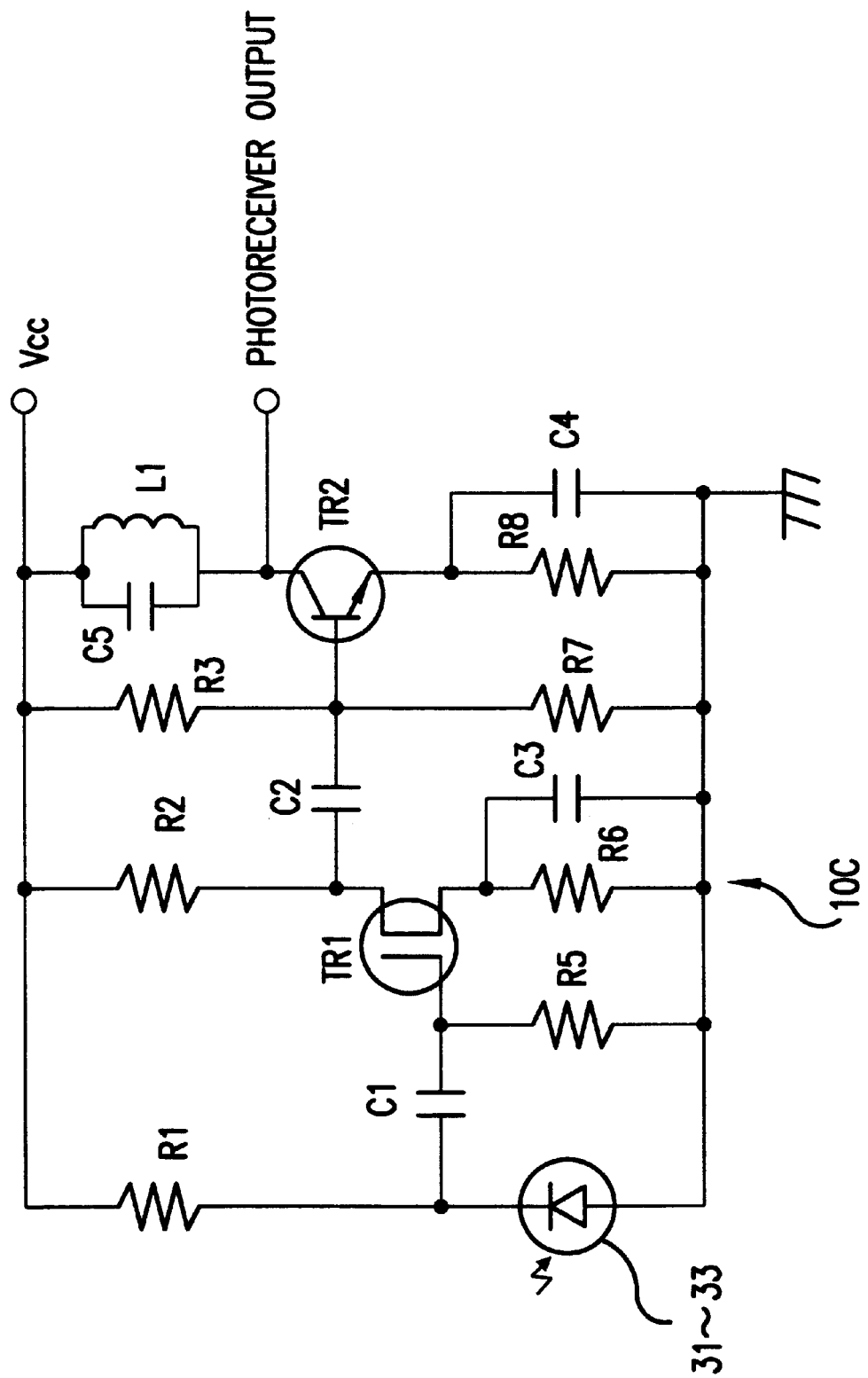
FIG. 9 is a circuit diagram of a modified amplifier included in a photoreceiver driving circuit.
Figure 10:
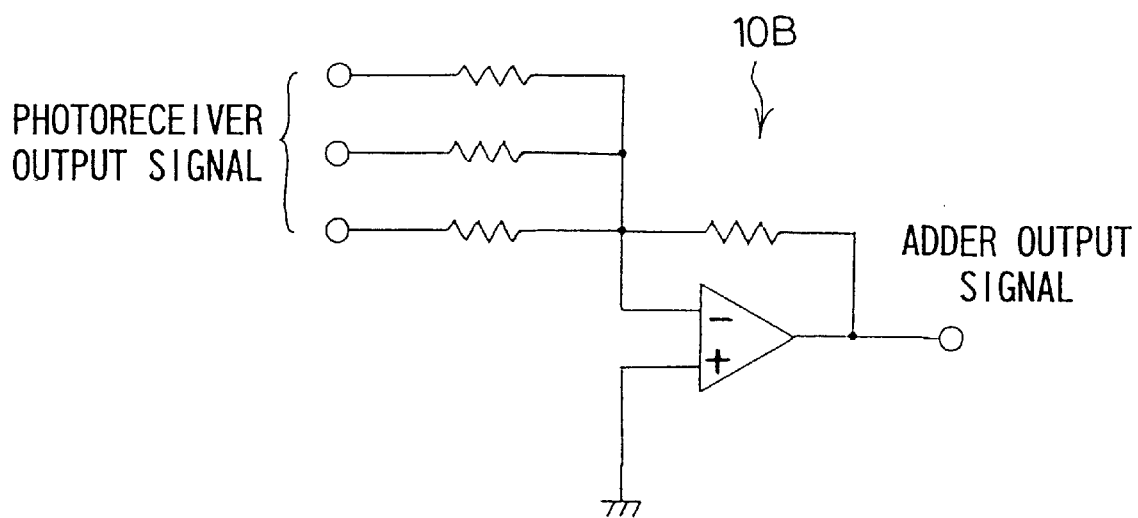
FIG. 10 is a circuit diagram of an adder included in the photoreceiver driving circuit.

The photoreceiver driving circuit 10 has an amplifier 10A shown in FIG. 8 and an adder 10B shown in FIG. 10. The amplifier 10A is connected to the photoelectric devices 31, 32 and 33 to amplify weak photoelectric currents generated by the photoelectric devices 31, 32 and 33. The amplifier 10A is a two-step amplifier comprising a FET (field effect transistor) TR1, an npn transistor TR2, resistors R1 to R8, and capacitors C1 to C4. The amplifier 10A amplifies the outputs of the photoelectric devices 31, 32 and 33 and directs a photoreceiver output to the adder 10B. An amplifier 10C shown in FIG. 9 is provided with a tuning circuit comprising a capacitor C5 and a coil L1, and may be employed instead of the amplifier 10A of FIG. 8. The amplifier 10C shown in FIG. 9 is a tuned amplifier which amplifies only a component of the modulating frequency tuned with the tuning circuit comprising the capacitor C5 and the coil L1.

In this embodiment, since the light beam projected on the document 8 is modulated in accordance with a fixed frequency, the current signal provided by each of the photoelectric devices 31, 32 and 33 has a carrier wave of a fixed frequency, and the amplifier 10C is a tuned amplifier, which amplifies only a component of the modulating frequency and does not amplify components of other frequencies. Therefore, the output of the amplifier 10C is not disturbed even if electrical noise, such as electromagnetic waves, is applied to the first stage of the amplifier 10C that amplifies weak photoelectric currents. Thus, the amplifier 10C has a satisfactory S/N ratio.

The adder 10B shown in FIG. 10 has an operational amplifier and adds the output photoreceiver signals of the amplifiers 10A or 10C (one amplifier for each photoelectric device 31, 32 and 33) of FIG. 8 or FIG. 9, respectively. Different circuitry may be used in place of that shown in FIG. 10 as long as it adds the output photoreceiver signals.

Figure 11:
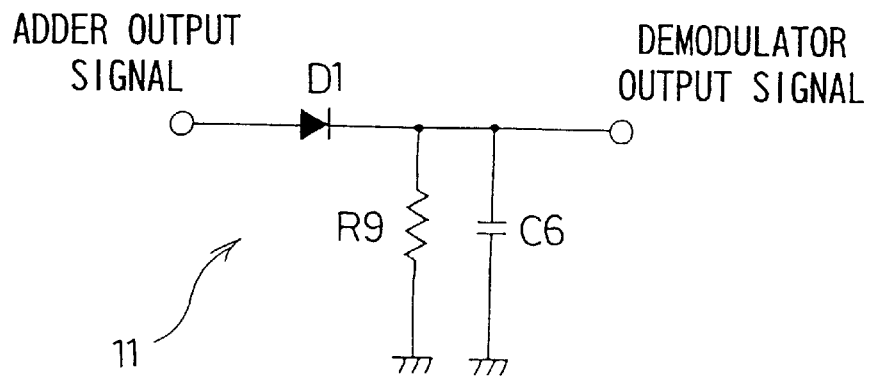
FIG. 11 is a circuit diagram of a demodulator.

The demodulator 11 shown in FIG. 11 is a detector comprising a diode D1, a resistor 9 and a capacitor C6. The resistance of the resistor R9 and the capacitance of the capacitor C6 are set to appropriate values dependent on the demodulating frequency. The output of the adder 10B shown in FIG. 10 can be demodulated to provide dc signals representing the densities of portions of the image on the document 8. Different circuitry may be used in place of the demodulator 11 shown in FIG. 11, which may include, for example, a plurality of diodes, resistors or capacitors that function as a demodulator.

Figure 12A:
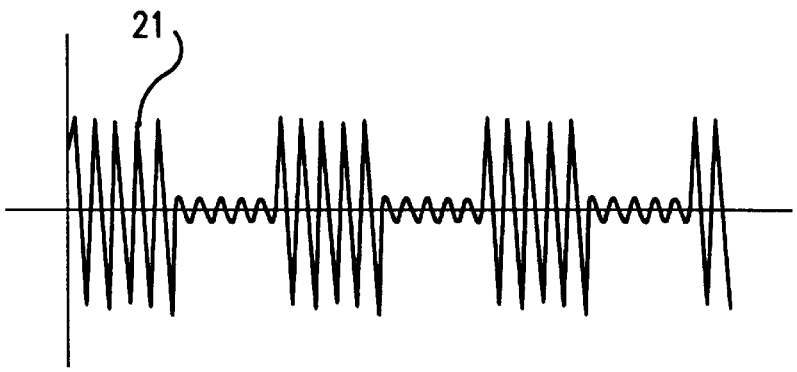
FIG. 12 is a waveform chart showing an input signal to and an output signal from a demodulator.
Figure 12B:
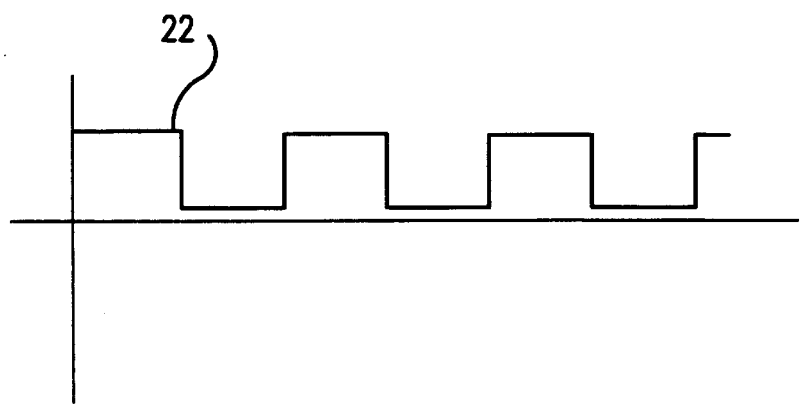

Since the output signal of the adder 10B is a signal having the carrier wave of the fixed frequency, noise signals can be removed by adjusting the resistance of the resistor R9 and the capacitance of the capacitor C6 of the demodulator 11 according to the modulating frequency, i.e., the frequency of the carrier wave, to provide an output signal 22 by demodulating and detecting the input signal 21 as shown in FIG. 12. The waveform of the output signal 22 is the envelope of the waveform of the input signal 21.

An optical scanner in a modified embodiment will be described hereinafter.

When an image is formed in ink or with a dye on the document 8, the image is visually recognized as a black image. However, it is possible that the image is detected as a white image due to reflection when the image is irradiated with infrared light. Therefore, it is desirable to use visible light for reading the document and hence the second semiconductor laser 2, i.e., reading light source, must emit a light beam of a wavelength in the range of 400 to 700 nm. Therefore, a solid laser, such as a YAG laser, may be used for the second semiconductor laser 2, or the second semiconductor laser 2 may be provided with a nonlinear optical device to reduce the wavelength of the laser beam.

Figure 13:
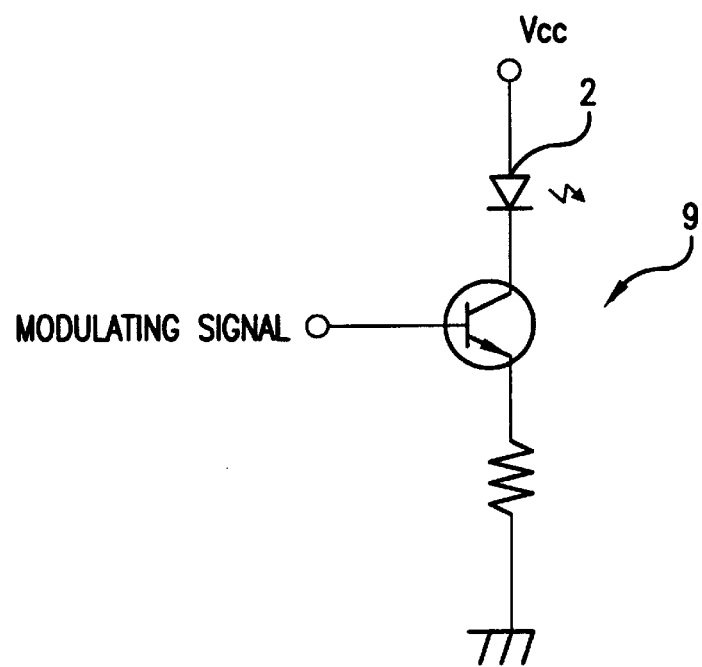
FIG. 13 is a circuit diagram of a modulator.

FIG. 13 is a circuit diagram of a modulator 9 to be used when a semiconductor laser is used as a light source for illuminating a document. The modulator 9 controls a current to be supplied to the semiconductor laser according to a modulating signal to modulate the light beam emitted by the semiconductor laser.

Figure 14:
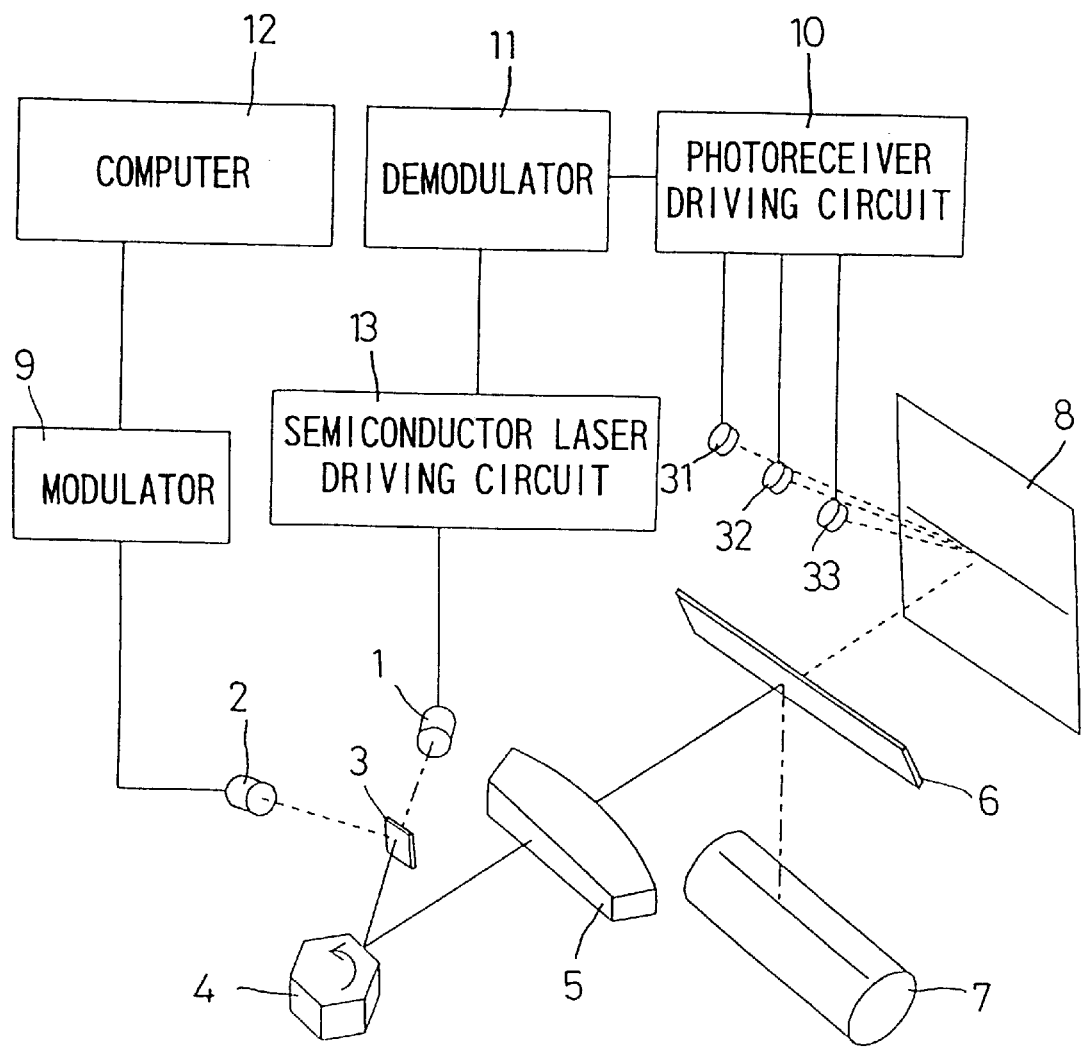
FIG. 14 is a typical view of an optical scanner in another embodiment according to the invention.

FIG. 14 shows an optical scanner in a second embodiment according to the present invention. A light beam emitted by a second semiconductor laser and modulated by a modulator 9 is condensed and deflected to scan a document 8. Photoelectric devices 31, 32 and 33, similar to those of the first embodiment, receive light reflected from the document 8, and image information representing an image on the document 8 is provided by the agency of a photoreceiver driving circuit 10 and a demodulator 11. A laser driving circuit 13 converts the image information provided by the demodulator 11 immediately into a write signal to be applied to a first semiconductor laser 1 to modulate a light beam emitted by the first semiconductor laser 1 on the basis of the image information representing the image on the document 8. Thus, an image information write operation for writing the image information read from the document is performed simultaneously with the image information read operation. The series of operations is carried out while a photosensitive member 7 is rotated in synchronism with a document feed operation for feeding the document 8. Thus, the document 8 can be copied by a single read cycle.

What is claimed is:

1. An optical scanner comprising:
   first and second light sources that emit first and second light beams having different wavelength characteristics;
   a beam synthesizing device that synthesizes the first and second light beams emitted by the first and second light sources so that the first and second light beams travel along a common optical path;
   a light deflecting device disposed on the common optical path to deflect the first and second light beams synthesized by the beam synthesizing device;
   a condensing device for condensing the first and second light beams deflected by the light deflecting device;
   a beam splitting device that splits the first and second light beams to cause the first light beam to fall on an image forming surface of a photosensitive member and to cause the second light beam to fall on an image surface of a document to be read;

a photodetecting device which detects light from the second light beam reflected and scattered from the image surface of the document;

a modulator that modulates the second light beam in accordance with a fixed frequency; and a demodulator that demodulates a signal provided by the photodetecting device in accordance with the fixed frequency to obtain a demodulated signal and that causes reading of image information from the document on the basis of the demodulated signal, wherein the first light beam is modulated in accordance with the demodulated signal provided by the demodulator.

2. The optical scanner according to claim 1, wherein the second light beam is a beam of visible light of a wavelength in the range of about 400 nm to about 700 nm.

3. The optical scanner according to claim 1, wherein each of the first and second light sources are a light-emitting semiconductor devices, and the modulator controls a driving current for driving the light-emitting semiconductor devices.

4. The optical scanner according to claim 1, wherein the photodetecting device comprises a plurality of photoelectric devices.

5. The optical scanner according to claim 1, wherein the beam synthesizing device and the beam splitting device are dichroic mirrors which reflect or transmit the first and second light beams in accordance with the wavelengths of the first and second light beams.

6. The optical scanner according to claim 1 further comprising an amplifier for amplifying an output signal of the photodetecting device.

7. The optical scanner according to claim 6, wherein the amplifier is a tuned amplifier.

8. The optical scanner according to claim 7, wherein the tuned amplifier includes an LC circuit.

9. The optical scanner according to claim 8, wherein the LC circuit comprises a bandpass filter.

10. The optical scanner according to claim 6 further comprising an adder for adding an output signal of the amplifier.

11. The optical scanner according to claim 10, wherein the demodulator comprises a diode, a resistor and a capacitor.

12. The optical scanner according to claim 1, wherein the demodulator comprises a diode, a resistor and a capacitor.

13. An optical scanner that includes a beam splitting device that directs a first light beam onto an image forming surface of a photosensitive member and directs a second light beam on to an image surface of a document to be read, the optical scanner comprising:

photodetecting means for detecting light from the second light beam reflected and scattered from the image surface of the document and generating an output signal based on the detected light;

a modulator that modulates the second light beam in accordance with a fixed frequency; and a demodulator that demodulates the output signal in accordance with the fixed frequency to generate a demodulated signal, the demodulator causing reading of image information from the document on the basis of the demodulated signal, wherein the first light beam is modulated in accordance with the demodulated signal provided by the demodulator.

14. The optical scanner according to claim 13, wherein the second light beam is a beam of visible light of a wavelength in the range of about 400 nm to about 700 nm.

15. The optical scanner according to claim 13, wherein each of the first and second light beams are generated by first and second light sources, respectively, each of the first and second light sources are light-emitting semiconductor devices, and the modulator controls a driving current for driving the light-emitting semiconductor devices.

16. The optical scanner according to claim 13, wherein the photodetecting means comprises a plurality of photoelectric devices.

17. The optical scanner according to claim 13, further comprising an amplifier for amplifying the output signal of the photodetecting means.

18. The optical scanner according to claim 17, wherein the amplifier is a tuned amplifier.

19. The optical scanner according to claim 18, wherein the tuned amplifier includes an LC circuit.

20. The optical scanner according to claim 13, wherein the photodetecting means comprises a plurality of photoelectric devices and each of the plurality of photoelectric devices generates one of a plurality of detection signals, further comprising:

an adder that adds the detection signals to produce the output signal, wherein the photoelectric devices are arranged so as to produce a uniform output signal.

21. The optical scanner according to claim 1, wherein a third optical path from one of the first and second light sources to the image surface of the document differs from a fourth optical path from the image surface of the document to the photodetecting device.

22. The optical scanner according to claim 1, wherein the photodetecting device receives the reflected and scattered light directly from the image surface of the document without any intervening optical devices.

23. The optical scanner according to claim 13, further comprising a first light source that generates the first light beam and a second light source that generates the second light beam, wherein a third optical path from one of the first and second light sources to the image surface of the document differs from a fourth optical path from the image surface of the document to the photodetecting means.

24. The optical scanner according to claim 13, wherein the photodetecting means receives the reflected and scattered light directly from the image surface of the document without any intervening optical devices.

* * * * *